(Model.)
G. EHRENZELLER-HOEGGER.
METHOD OF EMBROIDERING.
No. 345,127. Patented July 6, 1886.
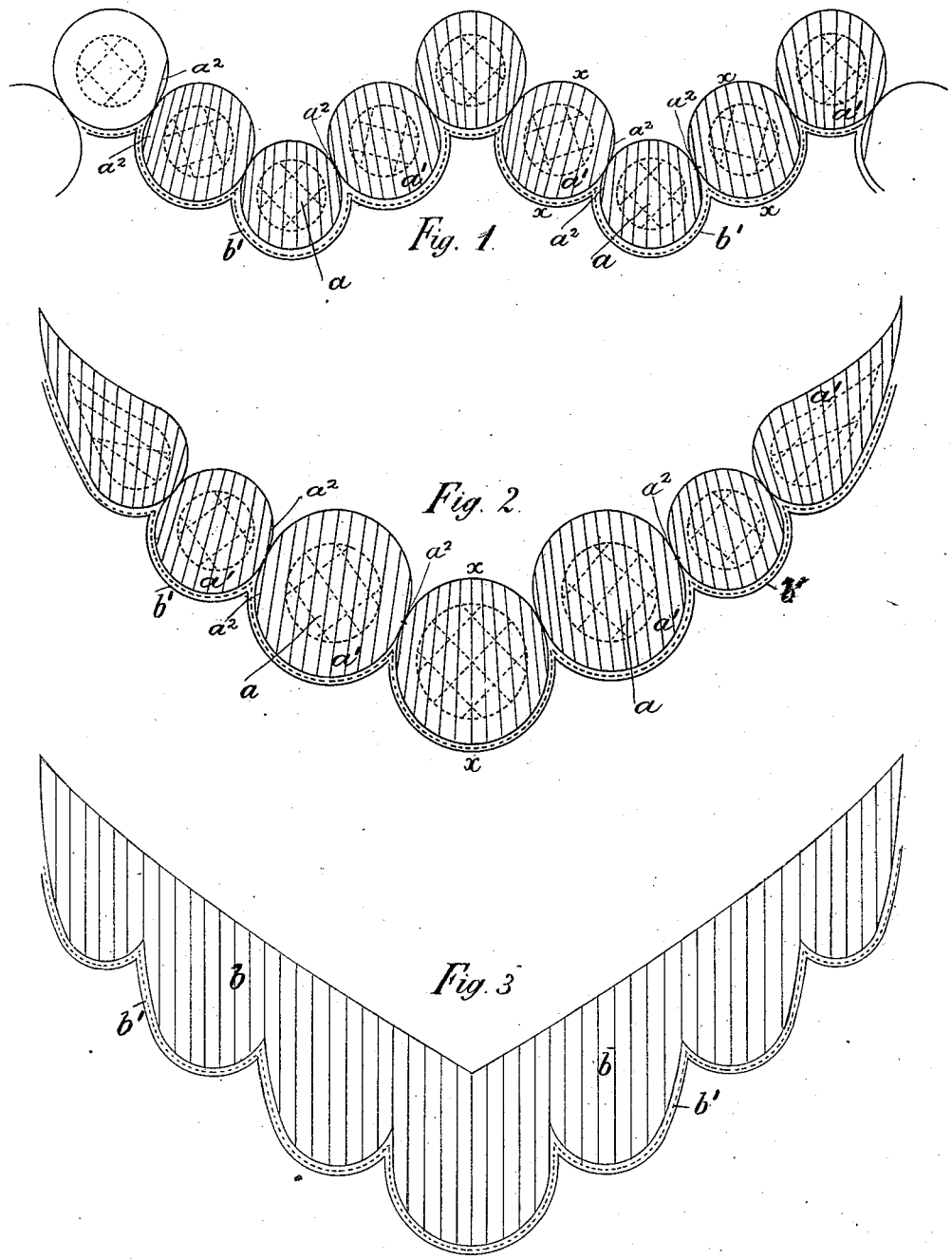
Witnesses,
C. T. Beet
O. A. Clark
Inventor,
George Ehrenzeller-Hoegger
By Paine Ladd,
Atty's.

UNITED STATES PATENT OFFICE.

GEORGE EHRENZELLER-HOEGGER, OF ST. GALL, SWITZERLAND.

METHOD OF EMBROIDERING.

SPECIFICATION forming part of Letters Patent No. 345,127, dated July 6, 1886.

Application filed February 17, 1886. Serial No. 192,242. (Model.)

*To all whom it may concern:*

Be it known that I, GEORGE EHRENZELLER-HOEGGER, a citizen of Switzerland, residing at St. Gall, in the Canton of St. Gall, Switzerland, have invented certain new and useful Improvements in the Manufacture of Bead Festoons for Machine-Embroidered Edgings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to embroidered edgings for textile fabrics; and it consists in forming the edgings in such a manner that they may have the appearance of festoons of beads.

In the drawings, Figures 1 and 2 represent edgings manufactured according to the present invention. Fig. 3 represents an edging such as manufactured prior to this invention.

All the figures are drawn to a considerably enlarged scale.

Prior to my invention edgings have been embroidered upon a textile background, and have consisted of a series of parallel stitches, $b$, and a festoon-shaped line of stitches, $b'$, as shown in Fig. 3. According to the present invention I may still use a festoon-shaped line of stitches, $b'$, on the lower side of the edging; but instead of forming the remainder of the festoon of a series of parallel stitches, I embroider stitches upon it in such a manner that the edging may have the appearance of a series of beads strung together in festoons. Embroidered edgings made in this manner have a much handsomer and richer appearance than those heretofore in use.

In manufacturing the bead-festoon edgings cross-stitches $a$ are first worked into the material, about where the center of each bead is to come, as shown by the dotted lines in the drawings, the object being to strengthen the material at these places, so that the shape of each bead may be preserved when embroidered upon it. Each bead is then embroidered onto the material, and consists of a series of stitches, $a'$, which are not arranged in parallel lines, but are placed obliquely and closer together than the stitches $b$.

In order that each bead in the festoon may appear to be circular when finished, the stitches are not worked upon the space occupied by a true circle, as an optical delusion would thereby be produced and the beads would appear to be flattened across the axis corresponding with the length of the stitches. Each bead is therefore embroidered upon a surface which is only approximately circular in form, being slightly elongated between the points $x$ $x$—that is, on the axis coinciding with the length of the stitches. The oblique arrangement of the stitches in the beads is caused by the necessity of making the end stitches, $a^2$, of each next adjacent bead join into each other in a straight line, so that there may be no stop or want of continuity in the manufacture.

Having thus described my invention, what I claim is—

The method of embroidering in imitation of festoons of beads upon the surface of a textile material, which consists in first forming a series of cross stitches upon the said background, and then embroidering the beads over the said cross-stitches, each bead being slightly elongated in form across the axis coinciding with the length of the stitches, and the said stitches being arranged obliquely, so that the continuation in a straight line of the last stitch of one bead will form the first stitch of the next bead, substantially as set forth.

In testimony whereof I affix my signature in presence of two witnesses.

GEORGE EHRENZELLER-HOEGGER.

Witnesses:
 JULIUS A. BOURRY,
 TH. E. MAERS.